United States Patent Office 3,160,128
Patented Dec. 8, 1964

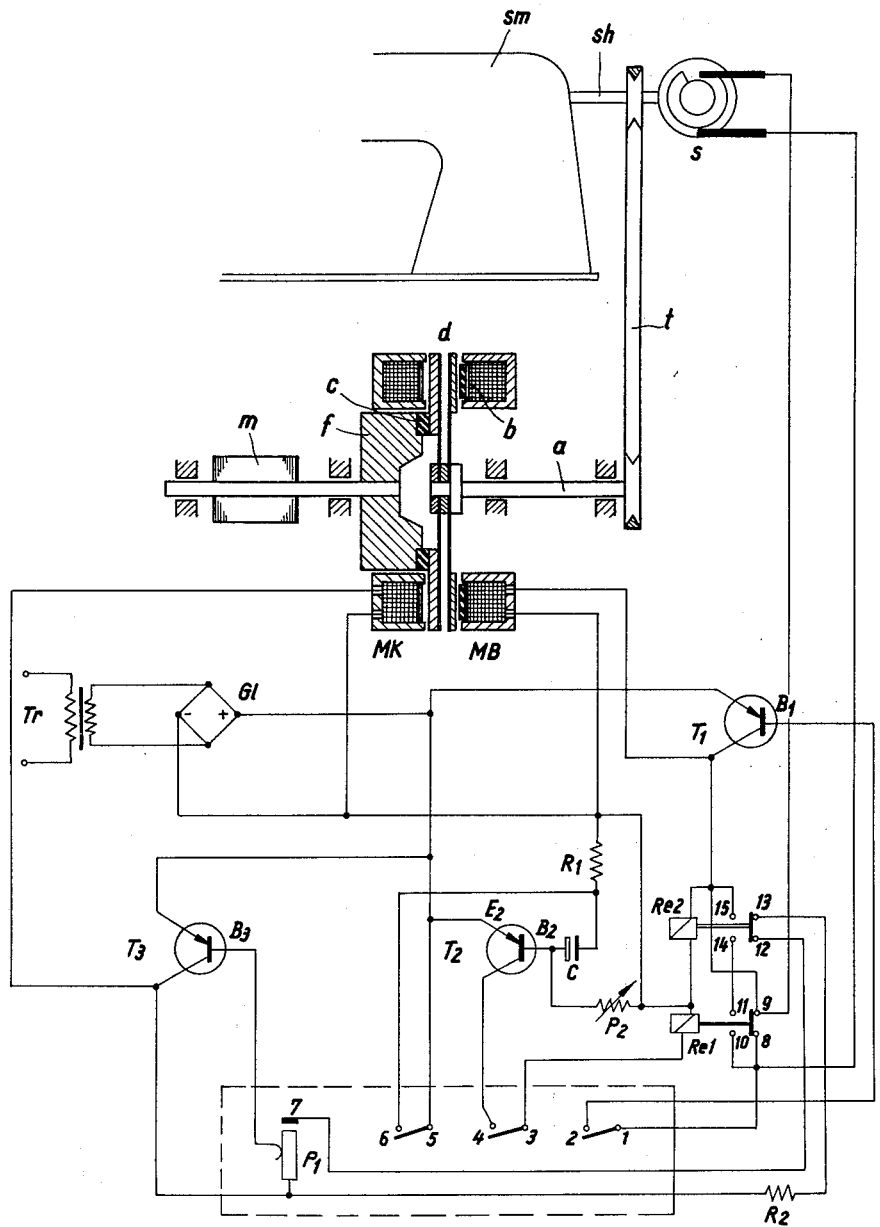

3,160,128
ELECTRICAL DRIVE MEANS FOR SEWING MACHINES OR THE LIKE AND MEANS FOR STOPPING SAID DRIVE MEANS IN PREDETERMINED POSITIONS
Alfred Heidt, Zaehringerstrasse 59,
Schwetzingen, Baden, Germany
Filed Sept. 14, 1962, Ser. No. 223,795
Claims priority, application Germany, Oct. 14, 1961,
F 35,141
7 Claims. (Cl. 112—219)

The invention relates to drive means for sewing machines or the like and is particularly concerned with drive means associated with stopping or braking means capable of stopping said drive means rapidly in predetermined positions. The driving and stopping means in accordance with the invention are especially, but not exclusively, applicable to sewing machines for the purpose of accurately stopping the needle in an upper or lower dead-center position. With high-speed drives, this stopping must take place in a very short space of time and control of the drive with relative independence of inertia is therefore necessary.

The invention is concerned with driving means in which the part to be driven is, on the one hand, connected to an electric motor by a controllable clutch and is, on the other hand, associated with a brake which, after the release of the clutch, stops the driven part and prevents it from continuing to run.

According to the invention, an electrical driving arrangement, particularly but not exclusively for a sewing machine, comprises a continuously running driving motor and means for stopping the drive in a predetermined position, including an electrically controllable clutch between the motor and the driven part and a brake, brought into action after the release of the clutch, which means are controllable by way of one or more transistors.

In a preferred embodiment of the invention, the means for stopping the drive include a connection in the control circuit of the transistor controlling the clutch which is interrupted and the clutch is de-energized whereupon the brake is brought into action. The brake, which may be connected electrically or mechanically with the clutch operating alternately therewith, is then automatically operated.

The brake and clutch may each have a separate transistor controlling it and the circuit arrangement may be such that simultaneously with cutting off the transistor controlling the clutch the transistor controlling the brake is cut in, or vice versa.

The transistor controlling the clutch may be controllable by a variable resistance or potentiometer in the end position of which the transistor is switched off.

The motor $m$ which drives the machine is provided or coupled in a known manner with a fly wheel $f$ which also carries the friction layer $c$ of an electromagnetic coupling MK. A coupling and braking disk $d$ connected with the drive shaft $a$ is adapted by virtue of the pulling force of the coupling magnet to engage the friction layer $c$, and by the pulling force of a braking magnet of an electromagnetic brake MB which is effective in the opposite direction to engage the brake lining $b$ thereof. A belt and chain transmission $t$ connects the drive shaft $a$ with the shaft $sh$ of the sewing machine $sm$. A contact device S is provided upon this shaft $sh$ which acts upon the circuit hereinafter described in that it interrupts its circuit in synchronism with the occurrence of a predetermined needle position of the sewing machine, in which position the machine is to be stopped.

The control circuit of the transistor controlling the brake may include means depending for operation on the position of a driven part, for example in the form of a synchronizing device for stopping means for sewing machines of a type known per se. The said means may serve to render the transistor conductive when a predetermined position of the driven part is reached.

Further advantages and details of the invention will become apparent from the following description with reference to the accompanying drawing which shows the circuit diagram for one embodiment of driving means in accordance with the invention, as particularly applied to a sewing machine drive whose motor is associated with an electro-magnetic clutch and an electromagnetic brake. The brake and clutch may be structurally combined in the motor housing or in/or on a bearing plate of the motor, in a manner known per se.

The circuit includes magnet windings MK for the clutch and MB for the brake. The winding MK is controlled by a switching transistor $T_3$ and the winding MB by a switching transistor $T_1$. The entire control circuit is fed with direct current from an alternating current supply by way of a transformer $Tr$ and rectifier bridge $G_1$. The transistor $T_3$ receives a control voltage at its base $B_3$ by way of a potentiometer $P_1$, which is incorporated in a foot-actuated control device for the machine. This device may be operated like a foot pedal starting device of generally known type. The end contact 7 of the potentiometer $P_1$ is a disconnecting end contact which, when reached, separates the base $B_3$ from the control voltage and de-energizes the transistor. An alternative connection by way of contacts 12, 13 will be referred to below. The transistor $T_1$ is supplied with a control voltage at its base $B_1$ by way of a synchronizing device S of which only the control or switching element is shown in the diagram. This element may consist, for example, of a photoelectric cell which is controlled by a light beam and which is energized and rendered conductive when the light beam is directed precisely on the cell by a mirror mounted on a moving part, for example the needle bar of the machine as the dead-center position of the said bar is reached.

The control operation is essentially as follows: When the foot operated device is operated, the transistor $T_3$ and the magnetic clutch MK are de-energized. At the same time, the magnetic brake MB is energized by way of the transistor $T_1$ and brakes the drive, normally bringing it to a standstill within one revolution. After a period of time adequate for this purpose, the brake is automatically released and is subjected to the control of the synchronizing device S and the drive is again coupled to the clutch. When the needle bar reaches the dead-center position, the device S causes the brake to be re-energized by way of the transistor $T1$ and thereby effects the final stopping of the drive in the correct position.

The timing of the stopping operation, which must be completed within one revolution or, exceptionally, within the next revolution, is ensured by relays $Re_1$ and $Re_2$ and a discharging capacitor C.

In addition to the potentiometer $P_1$, contacts 1, 3, 5 of three pairs of contacts 1, 2; 3, 4; 5, 6; are connected to the foot operated device. These contacts are normally open and are only closed when the potentiometer $P_1$ reaches its end position and the contact 7 is opened. Without the relays $Re_1$ and $Re_2$, on closure of the contact pair 1, 2, the transistor $T_1$ and the magnetic brake MB would immediately be energized. The relay circuit imposes a predetermined time sequence: As long as the contacts 3–6 are open, the capacitor C is charged through a resistance $R_1$, so that a blocking potential is applied to the base $B_2$ of transistor $T_2$. On the closure of the contacts 3, 4, the capacitor C can discharge. When the voltage, applied across the emitter $E_2$ and base $B_2$ of the transistor $T_2$, has faded away sufficiently after a corresponding period of time, the transistor $T_2$ becomes conductive and the relay $Re_1$ is energized through it. The discharge time for the capacitor C and hence the period after which the relay $Re_1$ responds can be determined by the magnitude of an adjustable resistance $P_2$.

During this period, the relay contacts and contacts 10, 11 remain open. Therefore, as the contacts 1, 2 are closed, the transistor $T_1$ will still remain conducting because its base $B_1$ is connected to the control voltage through the contacts 1, 2 and 8–9. The magnetic brake is thus energized. Also the relay $Re_2$ is energized, opening its contacts 12, 13 and closing its contacts 14, 15. By the opening of the contacts 12, 13, the contact 7 is isolated and re-engagement of the magnetic clutch is temporarily prevented. This condition persists until the capacitor C is sufficiently discharged. The relay $Re_1$ is then energized, opening its contacts 8, 9 and closing its contacts 10, 11. The transistor $T_1$ is de-energized and the brake and the relay $Re_2$ release when the synchronizing device S is momentarily not conducting, that is to say when the exact arresting position has not quite been reached. Due to the release of the relay $Re_2$, the contacts 14, 15 open and the contacts 12, 13 close. Voltage is thus applied to the contact 7 of the potentiometer $P_1$ and, through it, to the base of the transistor $T_3$, so that the magnetic clutch MK is re-energized and the drive continues to run.

If, during this continued running, the operative or contact region of the synchronizing device should be overrun for some reason, for example excessive speed, inadequate braking resulting from too short a contact time, or poor conducting or contact making at the said device, the small impulse produced by the device will still suffice to cause the relay $Re_2$ to respond. This relay is more sensitive than the magnetic brake MB and will close its contacts 14, 15 in response to a small impulse. The base $B_1$ of the transistor $T_1$ will therefore receive the control voltage through these contacts and the closed contacts 10, 11 in series therewith. The brake MB will be fully energized through the transistor $T_1$, despite the overrunning of the contact region of the synchronizing device.

This region is so narrow that the resulting stopping position will still satisfy the required accuracy. Without the contacts 10–11, however, the said region could be overrun again at each continued running and the machine would never be properly stopped.

Modern industrial sewing machines work with stitching rates of 3 to 4 thousand stitches per minute. If, at such working rates, the stopping operation is initiated halfway between two successive dead-center positions of the needle bar, the time remaining before the next dead-center position is no longer sufficient for building up the field of the magnetic brake and effecting accurate stopping. The above described arrangement, however, at least will ensure stopping during the next revolution of the drive.

As a consequence of the use of transistors, this control means needs only relatively small control currents and requires so little space that it can be conveniently accommodated together with the magnetic clutch and magnetic brake inside a motor bearing plate or in a housing similar to such a plate and attachable to the motor.

The motor is preferably an ordinary induction motor which may run continuously during use of the machine.

Instead of being fed through a separate line transformer Tr, the control circuit may be fed from an auxiliary winding on the motor. The use of such an auxiliary winding as a source of current is known for sewing machine lighting, but is open to criticism for reasons of safety. For the control circuit, however, such a winding can safely be used, as the considerations which affect the lighting connections do not apply.

Having now described my invention with reference to the embodiment illustrated in the drawings, I do not wish to be limited thereto, but what I desire to protect by Letters Patent of the United States of America is set forth in the appended claims.

I claim:
1. Electric drive control means for sewing machines of the type employing a continuously running driving motor, motor driven means and braking means for stopping said driven means in a predetermined position, said driven means comprising an electrically operated clutch having a clutch winding and said braking means including a brake winding, said drive control means comprising a circuit including said clutch winding, said brake winding, a first transistor having an operating circuit connected in circuit with said clutch winding, a second transistor having an operating circuit connected in circuit with said brake winding and having a control circuit, a synchronizer connected in said control circuit of said second transistor and having a circuit operative to actuate said control circuit, and switch means including a variable resistance device operative to interrupt current supply to said first transistor and to said clutch winding and to close the current supply circuit of said synchronizer to thereby energize said second transistor and said brake winding.

2. Electric drive control means for sewing machines of the type employing a continuously running driving motor, motor driven means and braking means for stopping said driven means in a predetermined position, said driven means comprising an electrically operated clutch having a clutch winding and said braking means including a brake winding, said drive control means comprising a circuit including said clutch winding, said brake winding, a first transistor having an operating circuit connected in circuit with said clutch winding, a second transistor having an operating circuit connected in circuit with said brake winding and having a control circuit, a synchronizer connected in said control circuit of said second transistor and having a circuit operative to actuate said control circuit, and switch means including a variable resistance device operative to interrupt current supply to said first transistor and to said clutch winding and to close the current supply circuit of said synchronizer to thereby energize said second transistor and said brake winding, said switch means having a contact separable in the end position of said resistance device to open the circuit of said first transistor and of said clutch winding and a contact operable to close the circuit through said synchronizer and said second transistor.

3. In a sewing machine having electric drive control means of the type employing a continuously running driving motor, motor driven means and braking means for stopping said driven means in a predetermined position, said driven means comprising an electrically operated clutch having a clutch winding and said braking means including a brake winding, said drive control means comprising a circuit including said clutch winding, said brake winding, a first transistor having an operating circuit connected in circuit with said clutch winding, a second transistor having an operating circuit connected in circuit with said brake winding and having a control circuit, a synchronizer connected in said control circuit of said second transistor and having a circuit operative to actuate said control circuit, and switch means including a variable resistance device operative to interrupt current supply to said first transistor and to said clutch winding and to close the current supply circuit of said synchronizer to thereby energize said second transistor and said brake winding, said switch means having a contact separable in the end position of said resistance device to open the circuit of said first transistor and of said clutch winding and a contact operable to close the circuit through said synchronizer and said second transistor, and a movable control device attached to a movable part of the machine operating in a predetermined position to activate said synchronizer electronically.

4. In a sewing machine having electric drive control means of the type employing a continuously running driving motor, motor driven means and braking means for stopping said driven means in a predetermined position, said driven means comprising an electrically operated clutch having a clutch winding and said braking means including a brake winding, said drive control means comprising a circuit including said clutch winding, said brake winding, a first transistor having an operating circuit connected in circuit with said clutch winding, a second transistor having an operating circuit connected in circuit with said brake winding and having a control circuit, a synchronizer connected in said control circuit of said second transistor and having a circuit operative to actuate said control circuit, and switch means including a variable resistance device operative to interrupt current supply to said first transistor and to said clutch winding and to close the current supply circuit of said synchronizer to thereby energize said second transistor and said brake winding, said switch means having a contact separable in the end position of said resistance device to open the circuit of said first transistor and of said clutch winding and a contact operable to close the circuit through said synchronizer and said second transistor, a movable control device attached to a movable part of the machine operating in a predetermined position to activate said synchronizer electronically, and a third transistor connected for operation to contacts of said switch means and connected in the circuit of said second transistor, and relay means operatively connected in the circuit of said third transistor means and controlled thereby and having delay contacts shunted across said synchronizer and having a relay winding associated with a variable resistance device and a condenser.

5. In a sewing machine having electric drive control means in accordance with claim 4, wherein said switch means includes contacts operative to open and close the circuits of said third transistor and of said relay means and thereby control the charging and discharging of said condenser through said variable resistance.

6. In a sewing machine having electric drive control means in accordance with claim 4, wherein relay means are provided associated with said second transistor including contacts linked to said first transistor means through said switch means and operative to open in response to operation of said second transistor as said switch means is operated.

7. In a sewing machine having electric drive control means in accordance with claim 4, wherein relay means are provided associated with said second transistor including contacts linked to said first transistor means through said switch means and operative to open in response to operation of said second transistor as said switch means is operated, said relay means further including a first auxiliary pair of contacts connected across said delay contacts and alternately operative therewith and connected in series with a second auxiliary pair of contacts, said first auxiliary pair of contacts being closed by said relay on opening said delay contacts and said second auxiliary pair of contacts being operative upon opening of said contacts linked to said first transistor through said switch means.

References Cited by the Examiner

UNITED STATES PATENTS

| 2,692,667 | 10/54 | Bliedung et al. | 112—215 |
| 2,946,418 | 7/60 | Leeson | 192—18.2 X |

JORDAN FRANKLIN, *Primary Examiner.*

DAVID J. WILLIAMOWSKY, *Examiner.*